June 4, 1963 H. L. SANGSTER 3,091,870

MAGNETIC-COHESION MODELS OF SCIENTIFIC AND MATHEMATICAL STRUCTURES

Filed Aug. 10, 1959 8 Sheets-Sheet 1

H. L. Sangster

H. L. Sangster.

H. L. Sangster.

H. L. Sangster.

H. L. Sangster

H. L. Sangster

H. L. Sangster

H. L. Sangster 3,091,870

MAGNETIC-COHESION MODELS OF SCIENTIFIC AND MATHEMATICAL STRUCTURES

Harold L. Sangster, Boyds, Md. (R.D., Dickerson, Md.)
Filed Aug. 10, 1959, Ser. No. 832,715
10 Claims. (Cl. 35—30)

This invention pertains to model elements of a magnetic self-cohering type, suitable for the building up of model structures for research, demonstration, educational and recreational purposes.

The recent literature of scientific and mathematical research, application, and education discloses a growing interest in "structures" and "models" in two entirely different senses. Reference is made to "structures" and "models" in an entirely abstract sense in context with the mathematical study of "the properties of pure numbers," "group theory," and related studies of number properties. Reference is also made to "structures" and "models" in context with the "operational definitions" of mathematical physics, in the continuum field-theory concepts of the properties of space, matter, and energy.

The modeling of natural structures in scientific research has been principally through the use of spherical model-elements, using adhesives and mechanical connectors. Some use has been made of tetrahedral model-elements. The tetrahedron is the elementary solid, or polyhedron, of classical geometry, usually classed with the octahedron, the cube, and the icosahedron, and the dodecahedron, as "regular polyhedra," or multisymmetric polyhedra, because they all have several axes of identical symmetry permitting their being inscribed within a sphere. The tetrahedron, however, is a unipolar multisymmetry, whereas the remaining four regular polyhedra, like the sphere, are dipolar multisymmetries.

The correlation, model-by-model, of sphere packs with geometric polyhedra, and the harmonization of magnetic dipolarity with geometric dipolar multisymmetry was essential to the development of the central disclosure of this patent application, which is the use of magnetism as the cohesive agency in modeling structures for scientific and mathematical research, demonstration, education, and recreation. The invention accomplishes this through the use of (1) dipolar multisymmetric magnetic model-elements, (2) sets of such model-elements including a discrete number of precisely-proportioned size classes, identical within each class, and (3) a magnetic jig, or frame, in which is inserted a magnet, and which is interrupted by a gap which can be adjusted in length, within which gap model-elements would be assembled into models.

The invention provides a model element, typically in the form of a solid sphere, substantially the entire surface of which is covered by distributed magnetic poles whose pole strength is sufficiently uniform that two or more of the elements exhibit strong mutual attractions for one another in all possible orientations.

Various embodiments of the invention are described below, in connection with the appended drawings, as follows:

(In these brief descriptions of the respective figures, all are front elevation views except where otherwise specified.)

Figure 1:
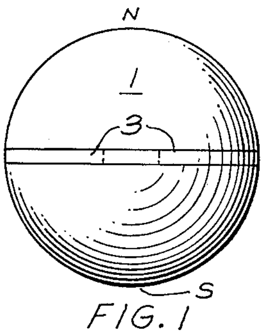

FIG. 1: A magnetically-segmented self-bonding dipolar magnetized sphere.

Figure 2:
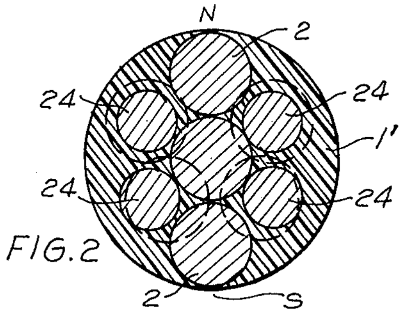

FIG. 2: A vertical central sectional view of an interstitially magnetically segmented icosahedral collection of solid spheres, acting as a simple dipolar magnetized sphere, with near-equatorial magnetic gaps.

Figure 3:
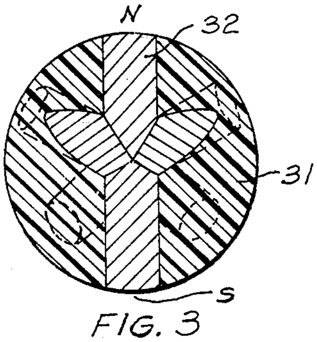

FIG. 3: An icosahedral intersection of elongated magnets in a low magnetical-permeability sphere, acting as a simple dipolar magnetized sphere, with an equatorial magnetic gap; shown in vertical section.

Figure 4:
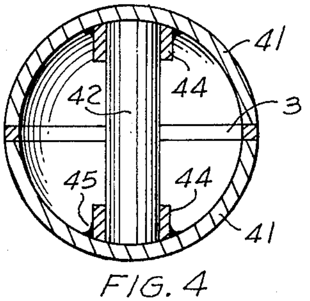

FIG. 4: A vertical sectional view of a dipolar elongated magnet enclosed concavely between two substantially hemispherical pole pieces, separated by a magnetic gap in the form of a ring of low magnetic permeability material, acting as a simple dipolar magnetized sphere, with an equatorial magnetic gap.

Figure 5:
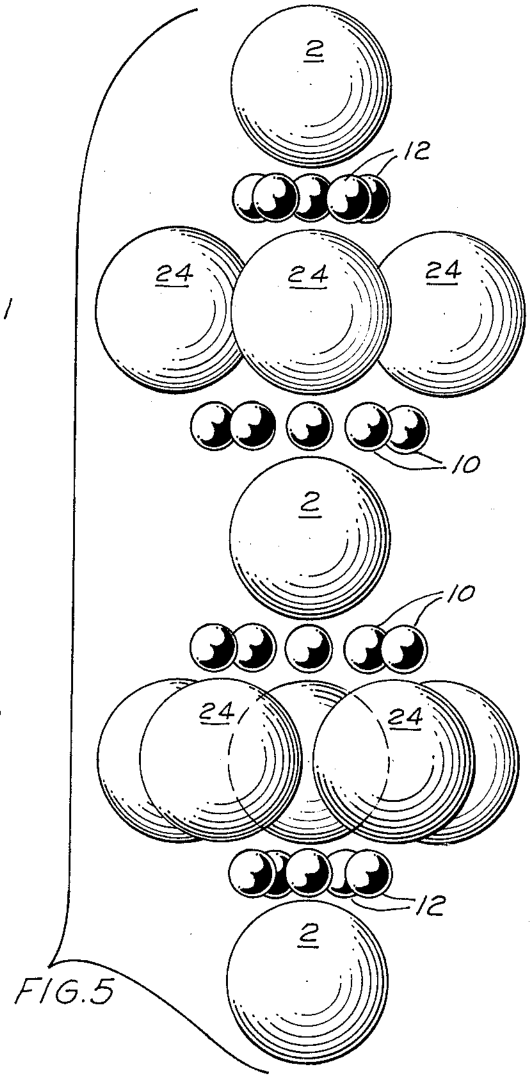

FIG. 5: An exploded drawing showing the component detail of the icosahedral grouping of FIGURE 2, including the interstitial spacer spheres.

Figure 6:
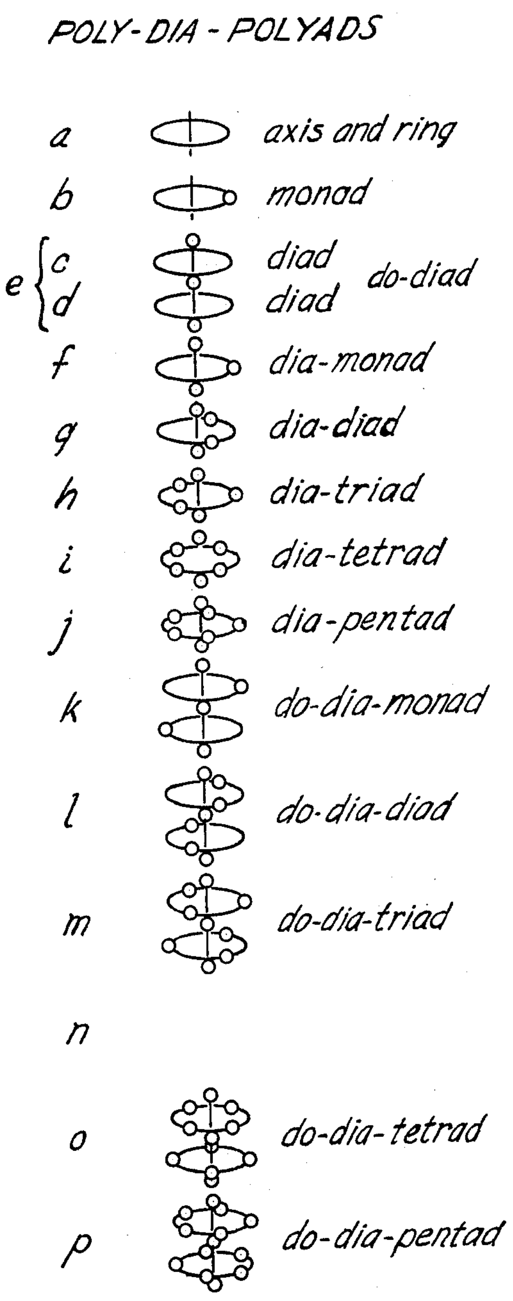

FIG. 6: A poly-dia-polyad sequence from monad to do-dia-pentad (icosahedron) of sphere pack models.

Figure 7:
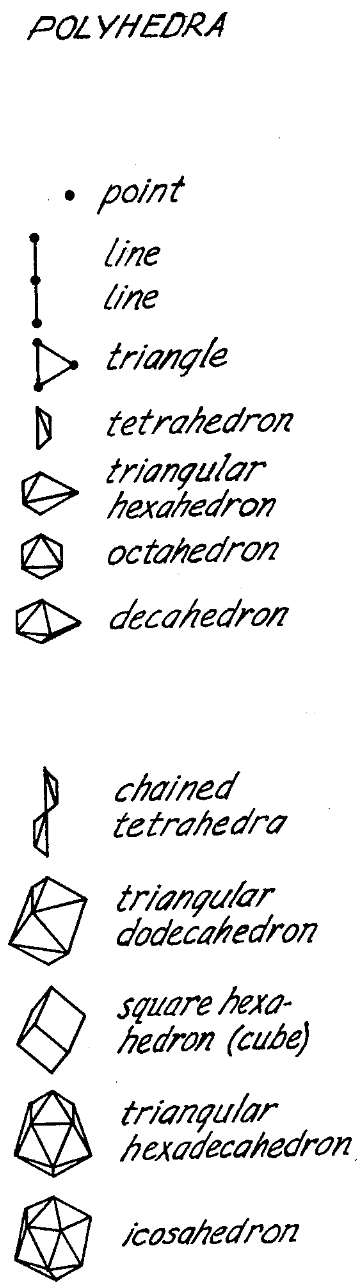

FIG. 7: The sequence of classical geometric polyhedra paralleling the sphere pack sequence of FIGURE 6.

Figure 8:
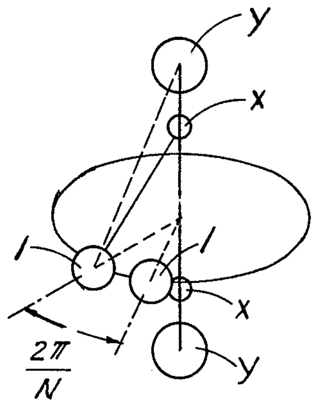

FIG. 8: A schematic isometric drawing of a generalized mono-dia-polyad sphere pack, exploded or separated for clarity.

Figure 9:
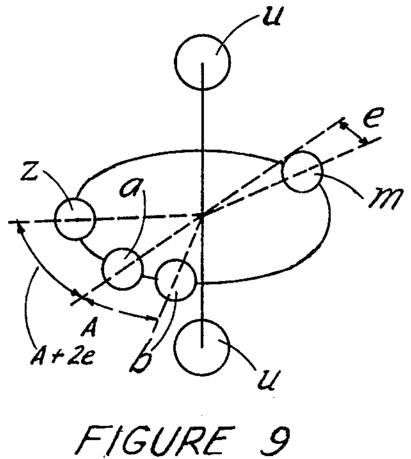

FIG. 9: A schematic isometric drawing of a generalized do-dia-polyad showing the theoretical elements of a generalized concept of asymmetry.

Figure 10:
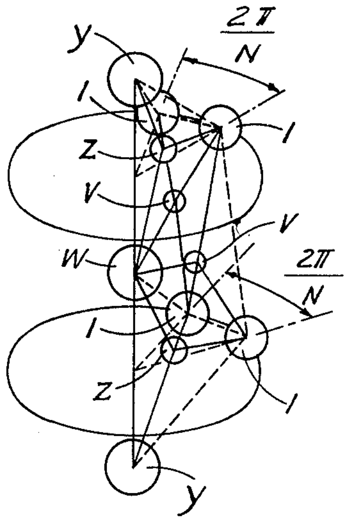

FIG. 10: A schematic isometric drawing of a generalized do-dia-polyad sphere pack, exploded or separated for clarity.

Figure 11:
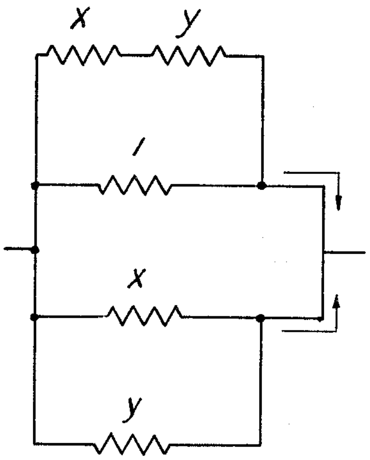

FIG. 11: An electrical bridge network having the same algebraic equation as the mono-dia-polyad.

Figure 12:
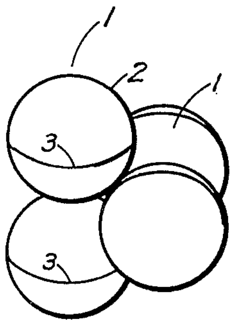

FIG. 12: An isometric view of a mono-dia-diad (tetrahedral) model formed by four dipolar magnetized spheres.

Figure 13:
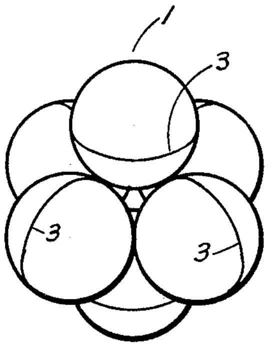

FIG. 13: An isometric view of a mono-dia-tetrad (octahedral) model formed by six dipolar magnetized spheres.

Figure 14:
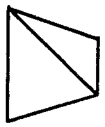

FIG. 14: The tetrahedron of classical geometry.

Figure 15:
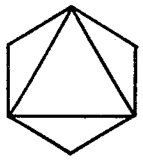

FIG. 15: The octahedron of classical geometry.

Figure 16:
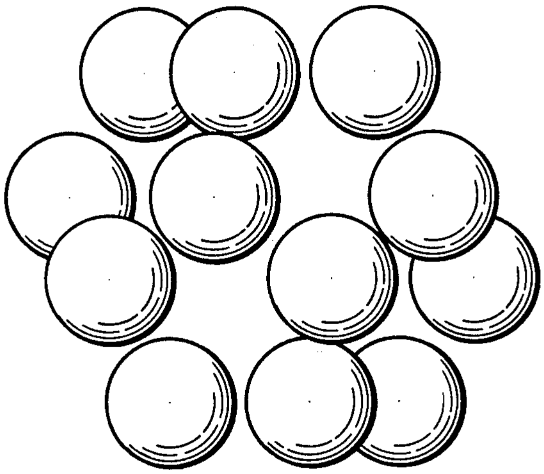

FIG. 16: An isometric drawing of a tetra-penta/do-dia-pentad (dodecahedral) sphere pack model.

Figure 17:
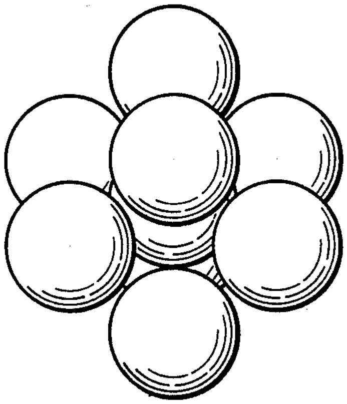

FIG. 17: An isometric drawing of a special cubic case of the do-dia-triad sphere pack model.

Figure 18:
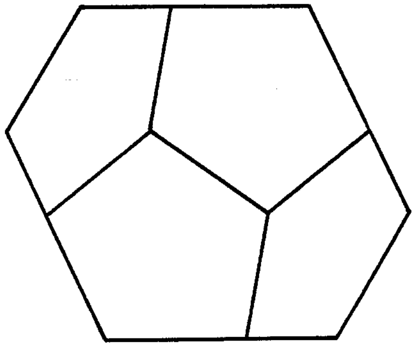

FIG. 18: An isometric view of a dodecahedron.

Figure 19:
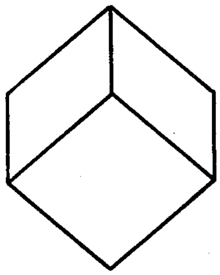

FIG. 19: An isometric view of a cube.

Figure 20:
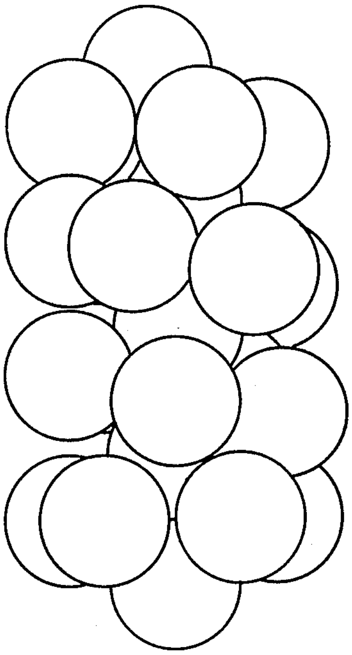

FIG. 20: A front view of a partial poly-dia-pentad discontinuous helix of two unlike strands.

Figure 21:
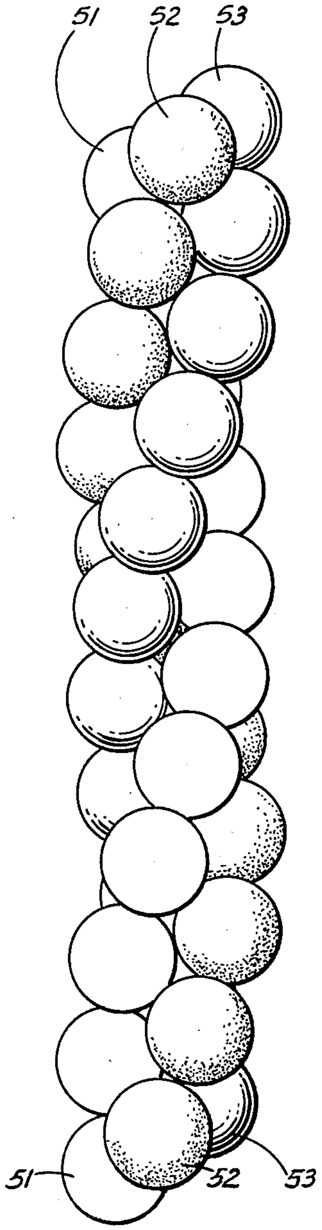

FIG. 21: A front view of a partial poly-triad geometrically ambiguous regular (1-, 2-,) 3-strand helix of like strands.

Figure 22:
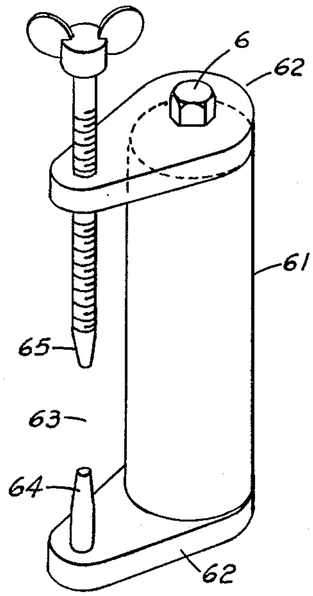

FIG. 22: A magnetic "jig" with magnet, and gap in which to form sphere pack models with elements made of high magnetic permeability material.

Figure 23:
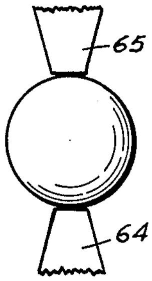

FIG. 23: A monad, or single sphere in the magnetic gap of the magnetic jig.

Figure 24:
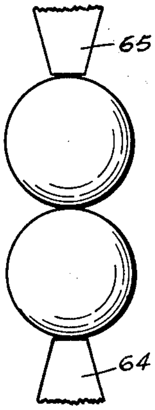

FIG. 24: A diad or sphere-pair in the gap.

Figure 25:
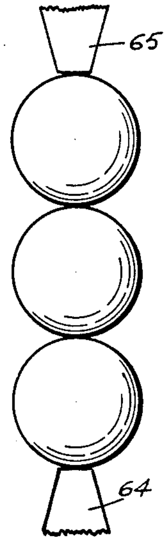

FIG. 25: A do-diad in the gap.

Figure 26:
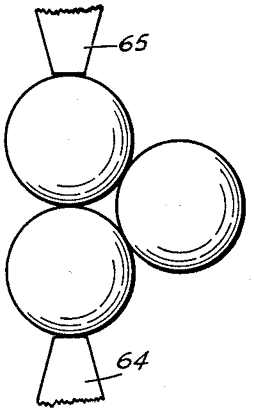

FIG. 26: A dia-monad in the gap.

Figure 27:
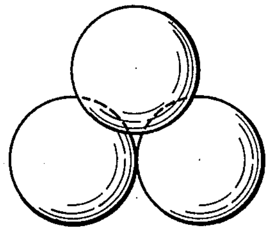

FIG. 27: A plan view of a dia-diad, or tetrahedral group.

Figure 28:
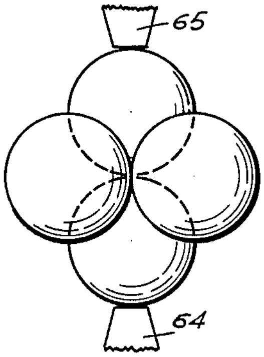

FIG. 28: A front view of a dia-diad in the gap.

Figure 29:
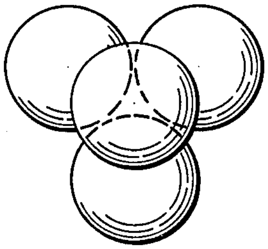

FIG. 29: A plan view of a dia-triad.

Figure 30:
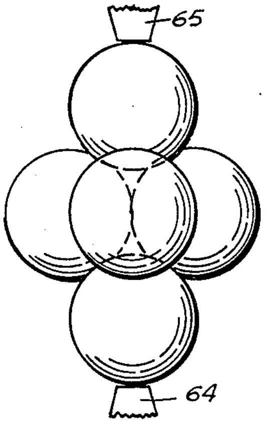

FIG. 30: A front view of a dia-triad in the gap.

Figure 31:
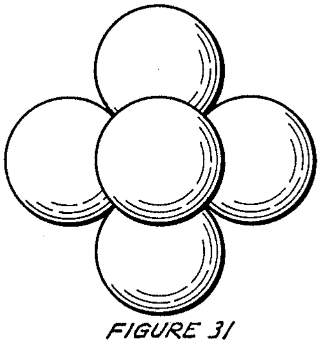

FIG. 31: A plan view of a dia-tetrad, or octahedral group.

Figure 32:
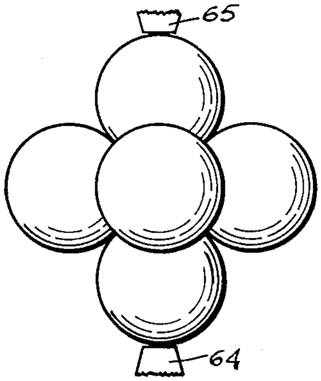

FIG. 32: A front view of a dia-tetrad in the gap.

Figure 33:
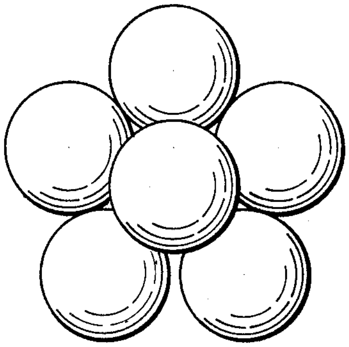

FIG. 33: A plan view of a dia-pentad with a ring gap.

Figure 34:
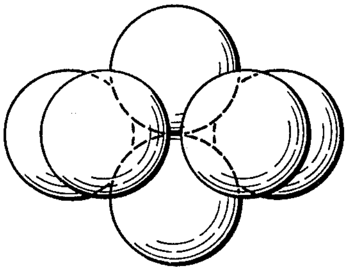

FIG. 34: A front view of the FIGURE 33 dia-pentad, showing the diad in contact.

Figure 35:
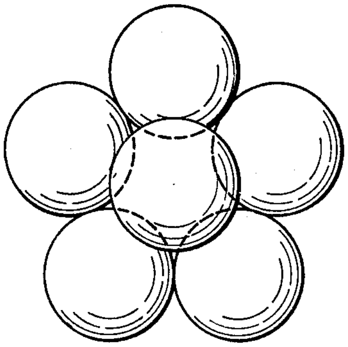

FIG. 35: A plan view of a dia-pentad symmetry, or dodecahedral grouping.

Figure 36:
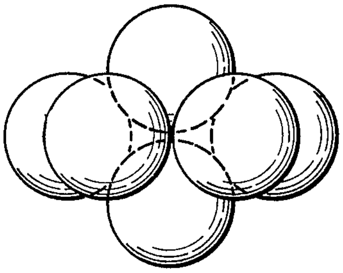

FIG. 36: A front view of the FIGURE 35 dia-pentad, showing the diad gap.

Figure 37:
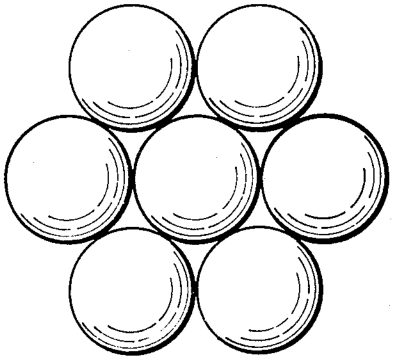

FIG. 37: A plan view of a mono-hexad, or plane hexagonal grouping.

Figure 38:
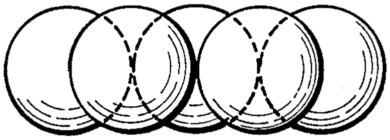

FIG. 38: A front view of the plane hexagonal grouping with "diads merged into monad."

FIGURE 1 shows a central section through a sphere 1 made of a high strength permanently magnetizing material, having an annular magnetic gap 3 cutting through the sphere substantially in a plane that is centrally perpendicular to the axis of symmetry. The magnetic poles are indicated by the symbols "N" and "S," according to the convention of magnetic theory, indicating that the model is magnetized along an axis which coincides with the geometric axis.

The magnetic gap would be occupied by an annular ring of material having a low magnetic permeability, comparable with that for air. The bonding of such elements would result through the provision of a high magnetic permeability path around the magnetic gap, through the material of a contiguous like element. The members of the poly-dia-polyad sequence of sphere pack models shown in FIGURE 6 would be formed from such members, or model elements.

One of the simplest methods for the manufacture of such a model element is by casting molten material having high strength permanent magnet properties, in a spherical mold, in which had been placed an annular ring of a material which had a higher melting point than the magnetic material, and having a low magnetic permeability comparable with that for air.

Another method of manufacture is by casting a sphere of high strength permanently magnetizing material, then grinding, sawing, or lathing out the material corresponding to the desired gap, and casting in the void, material of low magnetic permeability comparable with that for air.

A third possible method of manufacture of such an element is by sawing a sphere of a material having a high magnetic permeability completely through centrally, drilling each substantially hemispherical remainder centrally, starting from the plane sawed surfaces, and installing cylindrical magnets of a length such as to restore the spherical proportions excepting the gap.

FIG. 2 is a central section through a collection of identical spheres 2 in an enclosing spherical shape 1′, the spheres 2 being of a high strength permanently magnetizing material, and the enclosing sphere 1′ being of a material having a low magnetic permeability comparable with that of air. Spacers 24 (spheres) of a precisely scaled size are required to bring about the multi-symmetric collection which will serve as a dipolar self-bonding model. The diameter of the required spacer spheres for the icosahedral analogy of FIGURE 2 is:

$$D=\frac{\sqrt{3}\sin\frac{\Pi}{5}}{\cos\frac{\Pi}{5}}-1$$

relative to the diameter of the principal spheres taken arbitrarily as one unit.

This element will serve as a self-bonding dipolar magnet according to the same physical principle outlined earlier in this application, due to the inclusion of two groups of spacers having a material of low magnetic permeability comparable to that of air, as shown at 10 in FIGURE 5.

One of the simplest methods of making this element is by the placement of spherical components in the relative order shown in FIGURE 5, in a spherical container or mold, the spacer spheres 24 precisely causing the multi-symmetry to develop, then enclosing the assembly in a spherical shape 1′ of material having a low magnetic permeability comparable with that of air. This may be either by using a hollow spherical enclosure or by casting such material in a mold solidly around the icosahedral collection of principal spheres and interstitial spheres. (See the discussion of FIGURE 5.)

The spheres 2 will individually be polarized into hemispherical pole groups which will act as single magnetic poles, marked "N" and "S" according to the recognized convention of magnetic theory. The interstitial spheres 10 (of FIGURE 5) of low magnetic material furnish the magnetic gap, while the interstitial spheres 12 (of FIGURE 5) increase the permeability of the assembly except for the gap.

The FIG. 3 illustration is a central section through a sphere 31, of a material having a low magnetic permeability comparable with that of air, passed through on multisymmetric axes (shown here as axes of icosahedral vertices symmetries) by elongated shapes 32, of high strength permanently magnetizing material. This assembly is then magnetized along the geometric axis of symmetry into unlike poles, designated "N" and "S" according to recognized convention for magnetic theory.

This element will act as a self-bonding sphere pack model element under the same principle as the species shown in FIGURES 1 and 2, the low magnetic permeability material of the sphere 31, acting as the magnetic gap centrally perpendicular to the principal magnetic axis.

At least two simple methods of manufacturing the elements of the design shown in FIGURE 3 are visualized. The sphere 31, as described above, would be perforated by boring, or by coring when casting with holes suitable for receiving the elongated shapes 32, of high strength permanently magnetizing material, which would be prepared at their alternate interior and exterior ends as described above. A second method would be by the casting of such shapes 32 in material of the specification given for sphere 31.

The FIG. 4 illustration is a central section through an object that consists of two substantially hemispherical hollow pole pieces 41, fitted centrally in their interiors each with a ring 44, welded (45) into place. A magnetic gap 3 would be introduced in a centrally perpendicular location relative to the geometric axis of symmetry, and the pole piecees connected by a strong permanent magnet 42 fitted into the holders 44.

Several simple methods of manufacture are contemplated, the simplest probably being the forming by dies in a press of the substantially hemispherical pole pieces 41, the holder rings 44 and the magnetic gap ring 33, then welding at 45, inserting the magnet 42, and brazing at 3, latter specification assuming that the magnetic gap material is brass.

FIGURE 5: This illustration is an exploded schematic drawing of the component parts required to form the icosahedral collection of spheres for the model element shown (omitting the interstitial spheres, therein) in FIGURE 2. These parts include the principal spheres 2, of a high strength permanently magnetizing material; two pentagonal groups of icosahedral interstitial spheres 12, each sphere being of $$\left(\sqrt{3}\tan\frac{\Pi}{5}-1\right)$$

diameter relative to the diameter of the principal spheres; and of a high magnetic permeability material the same as the spheres 1; two pentagonal groups of icosahedral-interstitial spheres 10, of the same diameter as the spheres 12, but of a low magnetic permeability material.

FIGURE 6: FIGURE 6 shows a schematic representation of a sequence of poly-dia-polyads sphere pack models suitable for the study of the analogy of sphere pack models to classical geometry. This sequence begins with an abstraction including an axis, and a circle in a centrally perpendicular plane (*a*); a single sphere, or "monad" placed in the circle (*b*); then a sphere-pair, or "mono-diad" defining the axis (*c*); and a second diad (*d*); a pair of diads are referred to as a "do-diad" (*e*).

Next, (*f*) shows a mono-dia-monad model, meaning a single diad having a single sphere in its circle. The mono-dia-polyad sequence follows a logical order through: (*g*), a mono-dia-diad; (*h*) a mono-dia-triad;

(*i*) a mono-dia-tetrad; and (*j*) a mono-dia-pentad. After this we begin the "two-story," or do-dia-polyad sequence, ending with the do-dia-pentad (*p*) which is the analogy of the icosahedron of classical geometry.

The context of this sequence with the well-known conventional sequence of classical geometric polyhedra shown in FIGURE 7, makes unnecessary the further detailed discussion of FIGURE 6.

FIGURE 7: This is a schematic representation of the substantially conventional sequence of polyhedra (and the "elements," the "point" (*b*), and the "line" (*c*), of classical geometry. No discussion is necessary due to the long-established standing of this convention. However, two facts that are given an original emphasis in the parallel analogy between FIGURE 6 and FIGURE 7 should be pointed out. First, the sphere of unit dimension is put into analogy with the "point" of classical geometry. Second, the cube is shown as not fundamental, but as a special case of the triangular dodecahedron, where the proportions are such as to transform the twelve triangular faces into six square faces, and thus the cube. This fact is further illustrated in FIGURES 17 and 19.

FIGURE 8: FIGURE 8 is a generalized schematic diagram of a mono-dia-polyad, or single diad with an unstated range of numbers of members in the circle, which number is without theoretical limit due to the generalization of the diameters of the diad spheres "*y*." The symbol "*y*" both identifies and specifies the diameters of these spheres; similarly for the interstice spheres "*x*," and the circle spheres "1." For "N," an indefinite plurality of spheres in the circle, the uniform angle between the spheres is $2\Pi/N$ radians, where $2\Pi$ is a complete circle of revolution, according to established mathematical convention.

A general algebraic equation can be written, relating the diameter of the spheres in such a model, for certain structural assumptions. These assumptions are:

(1) Each "*y*" sphere is in perfect rigid contact with each "1" sphere.
(2) Each "*x*" sphere is in perfect rigid contact with each "1" sphere, and with its associated "*y*" sphere.
(3) The center-to-center spacing of the ring spheres "1" is "S" times the diameter of a ring sphere, where $S=1$, or greater than 1.

The algebraic equation for this situation is:

$$\frac{x\cdot y\cdot(x+y+1)}{(x+y)^2}=\frac{S^2}{4\sin^2 \Pi/N}$$

This analysis furnishes a basis for determining the precise proportional diameters, to any accuracy desired, for the three size classes of spheres required for any mono-dia-polyad model.

This arrangement is general in that by appropriately varying the diameter "*y*," and "*x*," relative to "1," any number of spheres "1" can be permitted in perfect rigid contact in the ring, thereby providing a basis for the study of angular functions, or trigonometry, by the use of the theorem of Pythagoras for the proportional dimensions of a right triangle, and algebraic process. However, for $y=1$, the equation becomes a saturated function, appropriate to the fact that the structure is possible only between the values of $N=1$, and $N=6$.

FIGURE 9: FIGURE 9 is an illustration of a scheme for the analysis of sphere packs in terms of asymmetry as the general case of sphere packs, where "*e*," the angle by which a sphere "*m*" departs from the location directly opposite the reference sphere "*a*," is the measure of the asymmetry of the model. Spheres "*a*, . . . *z*" are assumed to be uniformly spaced angularly, at an angle "A," as determined by the diameter of the spheres, and their rigid contact. The closure between sphere "*z*," and sphere "*a*," will differ from "A" by an angle of "2*e*."

The angle of asymmetry, "*e*," is general in that if "*e*"=0, the ring has even symmetry, whereas if "*e*"=½*A* the ring has odd symmetry. This furnishes the basis for considering asymmetry as the general case, within which the special case of even and odd symmetries occur. An algebraic equation for the mono-dia-polyad sphere pack can be solved in terms of "*e*," "N," and "*u*," thus making "*e*" the controlling variable. There may be significance in this analysis, to recent interpretations of atomic structure which attributed special significance to "skew," "lefthand and righthand," "lack of symmetry," etc.

FIGURE 10: This is a schematic illustration of the do-dia-polyads, analogous to that of FIGURE 8 for the mono-dia-polyads. A similar algebraic equation can be written.

FIGURE 11: It can be shown that the algebraic equation which is derived above for the mono-dia-polyad of FIGURE 8, applies in another sense to the electrical bridge circuit of FIGURE 11. This may have some significance in relating physical and mathematical principles. The symbols "*y*," "*x*," and "1" in this illustration apply to the values of electrical resistance that will result in a division of current flow as shown by the arrows, that is numerically the same as the righthand part of the algebraic equation, which is derived in the discussion of FIGURE 8.

FIGURE 12: This illustration shows a sphere pack mono-dia-diad or tetrahedron, formed of elements made according to the disclosure of this patent. The lines 3 around the spheres 1 represent the magnetic gap of the self-bonding magnetic dipolar spheres.

FIGURE 13: FIGURE 13 shows a mono-dia-tetrad or octahedral sphere pack model, using the same elements as are used in FIGURE 12. Note that the magnetic gap plane, of the ring spheres, is perpendicular to the gap plane of the diad spheres, in both FIGURES 12 and 13.

FIGURE 14: This figure is an illustration of the tetrahedron of classical geometry, which has an analogy in the sphere pack model of FIGURE 12.

FIGURE 15: This figure illustrates an octahedron of classical geometry, the sphere pack model analogy of which is shown in FIGURE 13.

FIGURE 16: FIGURE 16 accounts for the dodecahedron, which we might note does not occur fundamentally in the sequence of FIGURES 6 and 7. This model is formed by placing twenty spheres in the surface faces of an icosahedral model, that is to say, a do-dia-pentad model. The do-dia-pentad model interior to the dodecahedral (or tetra-penta/do-dia-pentad), model is omitted for clarity. It should be noted that (as the notation "tetra-penta/. . ." implies) the dodecahedral model can be analyzed by rings, four of them, each including five spheres.

This represents a first step in an important branch of sphere pack structures, the compounding by successive shell additions, around an icosahedral symmetry. It might be noted that scientific literature recently suggested as a model of the glass molecule, an icosahedral grouping of dodecahedra. It seems possible that the resulting lack of planes would account for the behavior of such solids under X-ray diffraction and Laue pattern analyses.

FIGURE 17: This illustration is an enlarged view of the special triangular dodecahedron of FIGURE 6–*n*, which is analogous to the cube, shown in FIGURE 7–*n*, and FIGURE 19.

FIGUFE 18: This figure represents the pentagonal (-faced) dodecahedron of classical geometry, the sphere pack analogy of which is shown in FIGURE 16.

FIGURE 19: A cube, i.e. a square faced hexahedron, is shown here, the analogy of which, in sphere packs, is the triangular hexahedron of FIGURE 17.

FIGURES 20 and 21 show two versions of helix which can be naturally modelled in sphere packs. FIGURE 20 is a portion of a skewed helical poly-dia-pentad, which is discontinuous irregular helix, which comprises a succession of mono-dia-pentads, as shown in FIGURE 6–*j*. The diads proceed in broken steps, "averaging" around a straight line, forming segments of a small-amplitude helix, while the outer strand forms a larger-amplitude helix.

The helix of FIGURE 21 is regular, with three identical strands, 51, 52, and 53. This helix may be said to be ambiguous, in a geometric sense, since it can be viewed as either a 1-strand helix, a 2-strand helix, or a 3-strand helix, by the appropriate choice of succession of spheres.

FIGURE 22: This figure illustrates a "jig," or frame, provided with a permanent, or electromagnet 61, the lower yoke 62 having a tapered projection 64 opposed to the tapered end of a wing-bolt 65, to provide a magnetic gap 63 within which to model, by the placement of appropriate elements. The wing bolt is engaged with threads in the upper yoke 62, to provide a means for the adjustment of the magnetic gap length to suit the requirements of the model.

FIGURES 23 through 36: These figures illustrate the formation of a sequence of poly-dia-polyads, corresponding to the mono-dia-polyad sequence FIGURES 6–*a* to *j*, only, formed within the magnetic gap of the jig illustrated in FIGURE 22. No detailed discussion is needed.

FIGURES 37 and 38: This model, the familiar plane hexagonal arrangement, is shown in plan view in FIGURE 37, and in front view in FIGURE 38, not because it can or would usefully be modelled in the magnetic gap of the jig, but to emphasize that it does belong in the do-dia-polyad sequence, as a limiting case. This fact, and its possible mathematical significance is mentioned in the discussion of FIGURE 8. The individual spheres of the diad may be considered to have merged into a monad, as would analogously be borne out in the algebraic equation given in the discussion of FIGURE 8.

I claim:

1. A model element comprising a body of solid material distributed about at least one axis and having an external completely closed surface defining about said axis a simple three-dimensional geometrical solid configuration; permanent magnetic means carried by said body for establishing predetermined permanent magnetic poles distributed continuously over the entire respective external surface portions of said body lying on opposite sides of a peripheral magnetically neutral zone which is at the intersection of the said external surface with a median plane of said body that is perpendicular to said axis.

2. A model element in accordance with claim 1, in which the means carried by said body comprises a permanent bar magnet lying lengthwise along said axis, and in which said body comprises a pair of magnetically permeable shell portions in flux-linking relation to the respective ends of said magnet.

3. A model element in accordance with claim 2, including a magnetically impermeable spacer disposed in said median plane and in contact with the proximate edges of said shells; the edge of said spacer forming a continuation of the surface of said configuration.

4. A model element in accordance with claim 1, in which the means carried by said body comprises a plurality of permanent magnets disposed in polarity-aiding relationship, and in which said body comprises a solid mass of magnetically low-permeability material embedding said magnets and having its external surface shaped to establish said geometrical configuration.

5. A model element in accordance with claim 1, in which the means carried by said body comprises a first plurality of three permanently magnetized contacting spheres having their magnetic axes in alignment along the axis of said body, a second plurality of magnetically permeable spheres spacedly disposed in ring formations about said body axis with the centers of those forming each ring lying in respective planes substantially perpendicular to said body axis, a third plurality of interstitial spheres of low magnetic permeability disposed in sphere-pack relation amongst the spheres of said ring formations and between the latter and the central sphere of said first plurality, a fourth plurality of interstitial spheres of high magnetic permeability disposed in sphere-pack relation amongst the spheres of said ring formations and between the latter and the terminal spheres of said first plurality; and in which said body comprises magnetically impermeable plastic material embedding all of said spheres.

6. A model element in accordance with claim 5, in which the spheres of said first and second pluralities have unit diameter, and in which the spheres of said third and fourth pluralities have a diameter equal to $$\sqrt{3}\tan\frac{\pi}{5}-1$$

7. A model element comprising a substantially completely enclosing shell of magnetically high permeability material, said shell being distributed about at least one axis therethrough; a peripheral belt of material of low magnetic permeability separating said shell into complementary sections, and means within said shell for establishing opposite magnetic poles substantially uniformly distributed over the respective sections of the total peripheral surface of the model.

8. A model element comprising a spherical body of solid material, and means carried by said body for establishing opposite permanent magnetic poles distributed as to polarity continuously over respective substantially hemispherical surface portions thereof lying on opposite sides of an equatorial zone thereof which is magnetically neutral.

9. For use in the demonstration of sphere-pack structure and the geometrical inter-relations of forms, a set of elements comprising a first plurality of model elements of equal size and each comprising a sphere permanently magnetized along an axis thereof with the opposite poles distributed substantially uniformly over the hemispherical sections lying on opposite sides of the equatorial plane perpendicular to said axis, and a second plurality of spherical model elements of the same size as those of said first plurality but formed of magnetically permeable material.

10. A set of elements in accordance with claim 9, further comprising a third plurality of spherical elements all of a diameter equal to the diameters of said first and second pluralities multiplied by a simple algebraic fraction.

References Cited in the file of this patent

UNITED STATES PATENTS

| | | |
|---|---|---|
| 2,277,057 | Bach | Mar. 24, 1942 |
| 2,475,450 | Dvorak | July 5, 1949 |
| 2,546,344 | Levy | Mar. 27, 1951 |
| 2,839,841 | Berry | June 24, 1958 |
| 2,882,617 | Godfrey | Apr. 21, 1959 |

FOREIGN PATENTS

| | | |
|---|---|---|
| 1,999 | Great Britain | Apr. 3, 1897 |
| 713,955 | Great Britain | Aug. 18, 1954 |

OTHER REFERENCES

Book: Mathematical Models, Cundy and Rollett, pp. 170–172, article 4.7 on "sphere-packs."